(12) United States Patent
Jones

(10) Patent No.: US 7,060,313 B2
(45) Date of Patent: Jun. 13, 2006

(54) CITRUS PEEL PROCESSING SYSTEM AND METHOD

(76) Inventor: Robert Allen Jones, P.O. Box 15097, Femandina Beach, FL (US) 32035

( * ) Notice: Subject to any disclaimer, the term of this patent is extended or adjusted under 35 U.S.C. 154(b) by 74 days.

(21) Appl. No.: 10/694,285

(22) Filed: Oct. 27, 2003

(65) Prior Publication Data

US 2005/0089614 A1    Apr. 28, 2005

(51) Int. Cl.
  *A23L 1/28* (2006.01)
  *A23L 2/02* (2006.01)
(52) U.S. Cl. .............. 426/489; 426/487; 426/478; 426/479; 426/482; 426/599; 426/431; 426/387
(58) Field of Classification Search ........... 426/487, 426/478, 479, 482, 599, 431, 387, 489
  See application file for complete search history.

(56) References Cited

U.S. PATENT DOCUMENTS

| | | | | |
|---|---|---|---|---|
| 2,022,471 A | * | 11/1935 | Leo et al. ............ | 426/577 |
| 2,086,911 A | * | 7/1937 | Hill .................... | 426/599 |
| 2,158,670 A | * | 5/1939 | Barnes et al. ......... | 426/651 |
| 2,635,095 A | * | 4/1953 | Norman ............... | 536/2 |
| 2,799,218 A | * | 7/1957 | Leslie et al. ......... | 100/37 |
| 2,818,342 A | * | 12/1957 | Ransom ............... | 426/584 |
| 3,745,020 A | * | 7/1973 | Lime et al. ........... | 426/509 |
| 3,821,449 A | * | 6/1974 | Swisher ............... | 426/438 |
| 3,868,466 A | * | 2/1975 | Swisher ............... | 426/616 |
| 4,225,628 A | | 9/1980 | Lynn | |
| 4,264,592 A | * | 4/1981 | Xhajanka ............. | 424/401 |
| 4,313,372 A | | 2/1982 | Gerow et al. | |
| 4,331,692 A | | 5/1982 | Drevici et al. | |
| 4,497,838 A | * | 2/1985 | Bonnell ............... | 426/429 |
| 4,547,226 A | | 10/1985 | Milch et al. | |
| 5,558,893 A | * | 9/1996 | Muraldihara .......... | 426/492 |
| 5,656,734 A | * | 8/1997 | Ehrlich ................ | 536/2 |
| 5,756,141 A | * | 5/1998 | Chen et al. ........... | 426/599 |
| 5,915,815 A | | 6/1999 | Moore et al. | |
| 5,965,177 A | * | 10/1999 | Lashkajani ........... | 426/51 |
| 5,997,930 A | | 12/1999 | Kendall et al. | |
| 6,000,144 A | | 12/1999 | Bussmann et al. | |
| 6,151,799 A | | 11/2000 | Jones | |
| 6,506,427 B1 | * | 1/2003 | Garti et al. ........... | 426/51 |

* cited by examiner

*Primary Examiner*—Anthony Weier
(74) *Attorney, Agent, or Firm*—Thomas C. Saitta

(57) ABSTRACT

A method and system for processing citrus peel to produce food grade products and environmentally safe liquid discharge, by cutting mixing, heating, separating, pressing and drying the citrus peel.

13 Claims, 3 Drawing Sheets

FIGURE 1-A
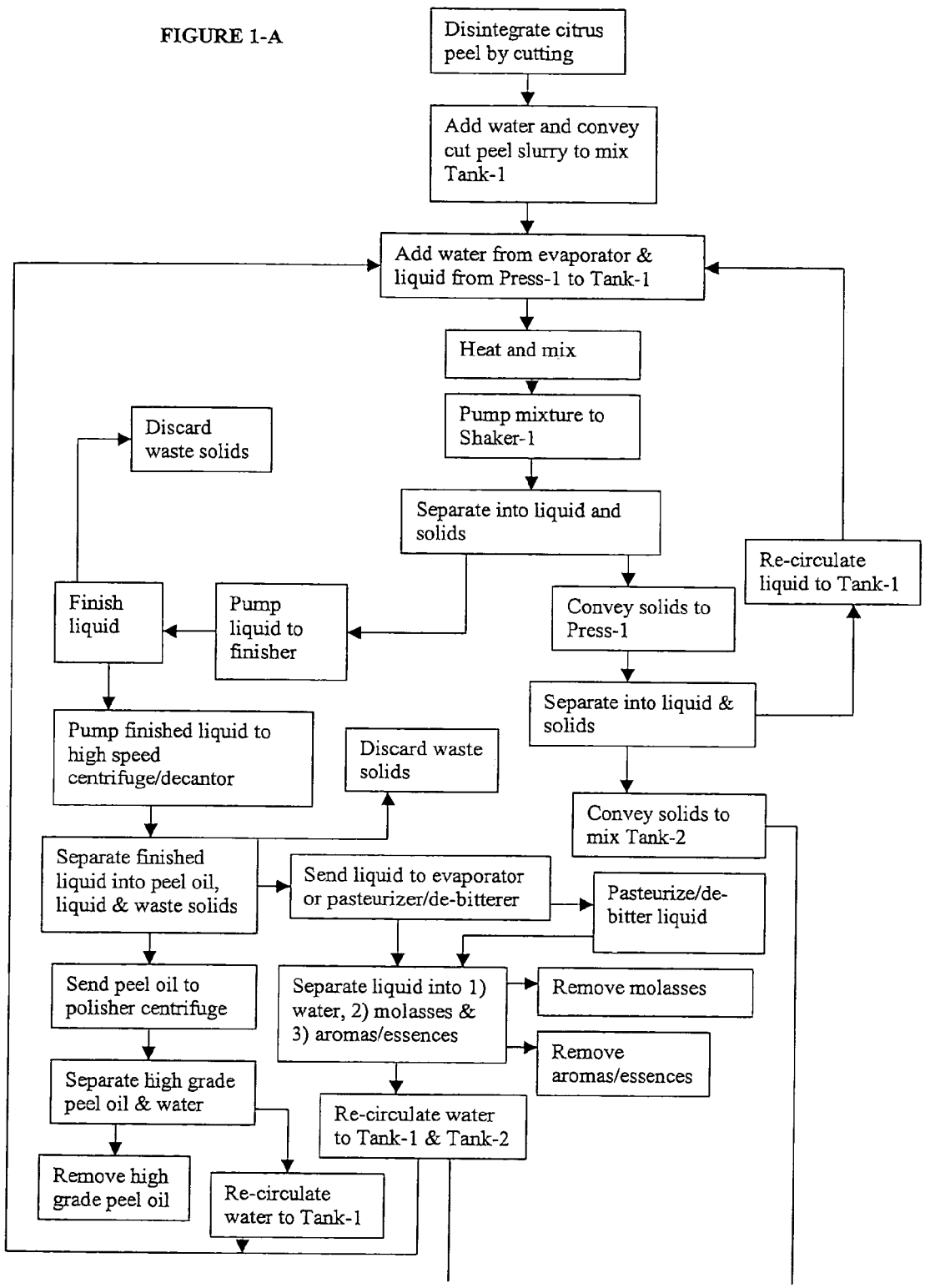

FIGURE 1-B
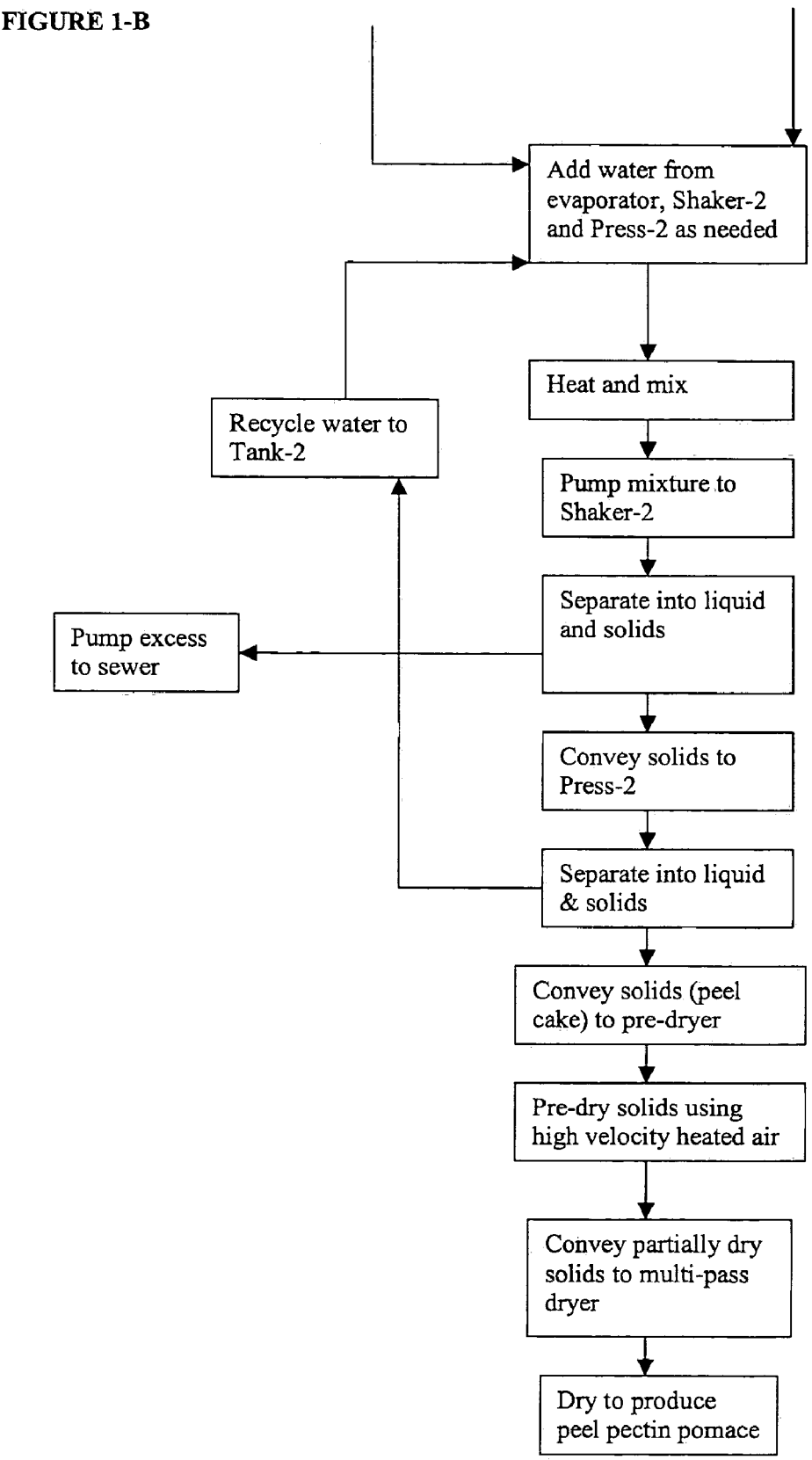

CITRUS PEEL PROCESSING SYSTEM AND METHOD

BACKGROUND OF THE INVENTION

This invention relates generally to the field of methods and processing systems for treatment of large volumes of citrus peel or similar waste products to be converted into useable products and to extract desirable components for distinct applications. More particularly, the invention is such a method and system for the processing of citrus peel, pulp waste and/or by-products which are produced during a juice extraction process, in order to recover useful liquid and solid components for future use, in a manner whereby the useful recovered components, such as d-limonene or peel oil, peel juice or syrup molasses, pectin pomace, citrus peel flour and many other liquid and dry masses, are of food-grade quality, and further such that the wastewater effluent produced by the system is sufficiently purified of suspended solids, soluble solids, sugars and oils, and in view of the fact that no chemical agents are added in the process, the waste water can be safely discharged into standard sewer systems due to its low biological oxygen demand (BOD), and where processing time, energy needs and costs are greatly minimized when compared to existing processes.

Nearly 50 billion pounds of citrus are processed each year, mainly to extract drinkable juices for the consumer market. The extraction of the juice creates a large amount of waste by-product in the form of orange peel, seeds, rag (the membranes between the citrus segments) and pulp. In the U.S., the waste organic material cannot be dumped into landfills, but instead must be converted into a useable product. The waste is primarily converted into citrus pulp pellets (CPP) for cattle feed, since the waste peel and other components provide filler and a protein source, although at only about 6% protein content it is not a high protein source food. Natural citrus peel oil contained within the peel is a marketable by-product, and current processing removes approximately 25–40 percent of the total available quantity from the peel by extractors compressing the fruit sphere prior to removal of the juice and further processing. The oil is then further processed and refined and currently sells at about $1.00 per pound in the form of cold press peel oil. The current technology for processing the waste peel operates at a loss—the costs are more to process the material than can be regained by selling the resulting products as a non-food grade material due to toxic chemical dewatering methodology.

The current state of the art for processing citrus peel is a system which squeezes the peel to remove some of the citrus oil, slices the fruit in half, reams or presses the halves to remove the juice and pulp, and ejects the waste peel, rag, seed, etc. to a conveyor for transport to a peel processing plant. The peel is then delivered into fixed rotor blade hammer mills which rotate and thrash the peel in a very inefficient manner relative to particle size and rate control, with resulting particles ranging from one square inch pieces up to entire fruit halves. The thrashed peel is then placed into mixing augers where lime (calcium oxide) is added to dehydrate the peel, the lime contacts free water forming a basic anhydride reaction, producing calcium hydroxide (CaOH), which is toxic. Alternatively, the lime is sometimes applied prior to the hammer mill step. The result is an orange peel cake material containing about 80% residual water. The addition of the lime renders any subsequent products unsuitable for human consumption. The thrashed waste material is pressed, which removes approximately 10 to 15% of the free water along with some residual oil, which is called pressed liquor. The liquor is pumped to waste heat evaporators where water is evaporated to produce a low brix molasses of about 50 brix sugar content. This molasses is sprayed onto the cattle feed pellets produced from the peel particles to enhance the flavor and subsequent ingestion by beef and dairy cattle. The pressed peel particles are then passed through large, gas-fired, single-pass or multi-pass, low rpm (3–10), rotary dryers, typically about 18 feet in diameter by 80 feet in length, where predominantly gas fired air is heated to about 1500 degrees F. and raises the particle temperature to a range of about 290 to 700 degrees F. over the course of about 45 minutes. The high heat of the air in the dryer actually combusts or flashes off most of the volatile liquids and gases in the peel, emitting VOC's and associated hydrocarbons into the exhaust air to atmosphere. Burnt gases, liquids and solids coat and foul the interior ductwork and dryer contact surfaces, often leading to fires within the equipment and fan blade failures. Since the exhaust air contains a large amount of contaminants such as particulate matter, VOC's, oil, moisture, etc.; the air flow must pass through scrubbers to remove a significant portion of the contaminants. The scrubbers typically utilize water sprays, which drastically reduces the potentially recoverable heat energy of the exhaust air by about two thirds. This scrubbed air is then passed to heat recovery equipment, where the lowered heat value (about 180 degrees F.) is then used as the heat source in waste heat evaporators for the production of molasses. Currently, exhaust air must be scrubbed prior to passage through the heat recovery equipment to prevent plate surface fouling, which reduces performance and may cause failure. The dryer-discharged, dried peel matter has a moisture content of about 10 to 15% and is then pelletized into citrus peel pellets, ranging from about ⅜ to ¼ inches in diameter and from about ¼ to one and one quarter inches in length. The pellets are then sold as cattle feed at a price of about $40/ton, even though the processing costs to produce the pellets ranges from about $60–70/ton. The current systems utilize oil or natural gas combustion heating, are processes utilizing equipment which are not able to be cleaned on-line except by shutting down the process, are unable to recoup most of the exhaust heat energy, produce contaminated air which must be scrubbed prior to reuse or exhaust to the atmosphere, cannot remove any of the 85–90% residual citrus oil, and cannot produce a food grade product for human consumption due to the addition of lime during the process.

An improved method and system to those described above is disclosed in my U.S. Pat. No. 6,151,799, issued Nov. 28, 2000, wherein the disclosed invention comprises means to convey the waste citrus peel to a pulping means, preferably comprising a storage conveyor, an elevator conveyor, a metering tube and continuous weigh belt such that the delivery of the peel occurs in a controlled, uniform manner rather than by batch delivery, means to elevate the temperature of the waste peel, preferably comprising a live steam jacket incorporated into the metering tube, pulping means to fragment the waste peel into particles of small size thereby creating a slurry of water and citrus oil, preferably comprising a high-shear rotary disintegrator, means to separate liquid from the waste particles, preferably comprising a vibratory shaker table with hot water spraying system and a press, means to subsequently dry the solid particles, preferably comprising a defragmentor, a fluidized, dynamic bed, low temperature, high air volume circulation dryer, heat recovery means for reuse of the dryer exhaust air, preferably comprising an exhaust air particulate screener and heat exchanger unit, the heat recovery means acting to preheat air for the dryer and/or to evaporate water from press liquor to create molasses, and centrifuge means to remove water and solids from the oil/liquid emulsion from the shaker table to create marketable citrus oil. This system, however, suffers from certain inadequacies and does not fully address the issue of wastewater composition.

It is an object of this invention to provide a system and method which addresses the drawbacks from the current waste peel processing and drying systems. It is an object of this invention to provide a waste peel collection, processing and drying system and methodology to recover useful liquid and solid components for future use, in a manner whereby the useful recovered components, such as d-limonene or peel oil, peel juice or syrup molasses, pectin pomace, citrus peel flour and many other liquid and dry masses, are of food-grade quality, and further, such that the wastewater stream produced by the system is sufficiently purified of suspended solids, soluble solids, sugars and oils, and in view of the fact that no chemical agents are added in the process, the waste water can be also used as a consumable liquid commodity and of course safely discharged into standard sewer systems due to its low biological oxygen demand (BOD).

SUMMARY OF THE INVENTION

The invention is a system and method for processing citrus peel and pulp after the juice has been removed in order to recover components of value, such as d-limonene, molasses, and pectin pomace, and human-consumable peel mass for future use, wherein the recovered components are of food-grade quality. In addition, the system and process produces a low Biological Oxygen Demand (BOD) water waste free of added chemicals, such that the effluent water can be passed directly into standard sewage systems.

The system components comprise a means to cut, shear or slice the citrus peel into small particles to create a slurry via the addition of plant water or water from another adequate quality water source, conveying or conduit means to deliver the slurry to first tank means wherein the peel solid particles are mixed with liquid and heated, conduit means to deliver the mixture to a first separator means wherein the liquids and solids are separated, conduit means to deliver the separated liquid to a rotary finisher means wherein waste solids are separated from finished liquid, conduit means to deliver the finished liquid to a high speed centrifuge and decanting separator means wherein primary citrus peel oil (d-limonene), a liquid stream and waste sludge are separated, conduit means to deliver the citrus peel oil to a polisher centrifuge means wherein high grade peel oil is produced, and conduit means to deliver the de-oiled and de-sludged liquid from the high speed centrifuge/decanter means to an evaporator means, wherein the liquid is divided into three useful products—evaporated water proportionally distributed to first tank means and second tank means, as well as a consumable salable liquid flow, food grade citrus peel juice referred to as molasses, and high quality aromas and essences. Supplemental pasteurization/de-bittering means to pasteurize and/or de-bitter the liquid may be employed prior to the evaporator means when necessary for product criteria demands. The systems components further comprise conduit means to deliver the wet peel solids from the first separator means to a first press means, wherein liquid is separated from the solids and distributed to first tank means, conduit means to deliver the solids to second tank means, wherein the pressed peel solids are mixed with liquid and heated, conduit means to deliver the mixture to a second separator means, wherein the liquid is separated from the solids and distributed partially to second tank means, conduit means to deliver the saturated pressed peel solids to a second press means, wherein liquid is separated from solids, conduit means to deliver the solids to a first dryer means, and conduit means to deliver the partially dried solids to a second dryer means wherein pectin pomace or food grade peel mass end product are produced.

BRIEF DESCRIPTION OF THE DRAWINGS

FIGS. 1A and 1B show a schematic flow chart showing the method of the invention.

DETAILED DESCRIPTION OF THE INVENTION

Figure 2:
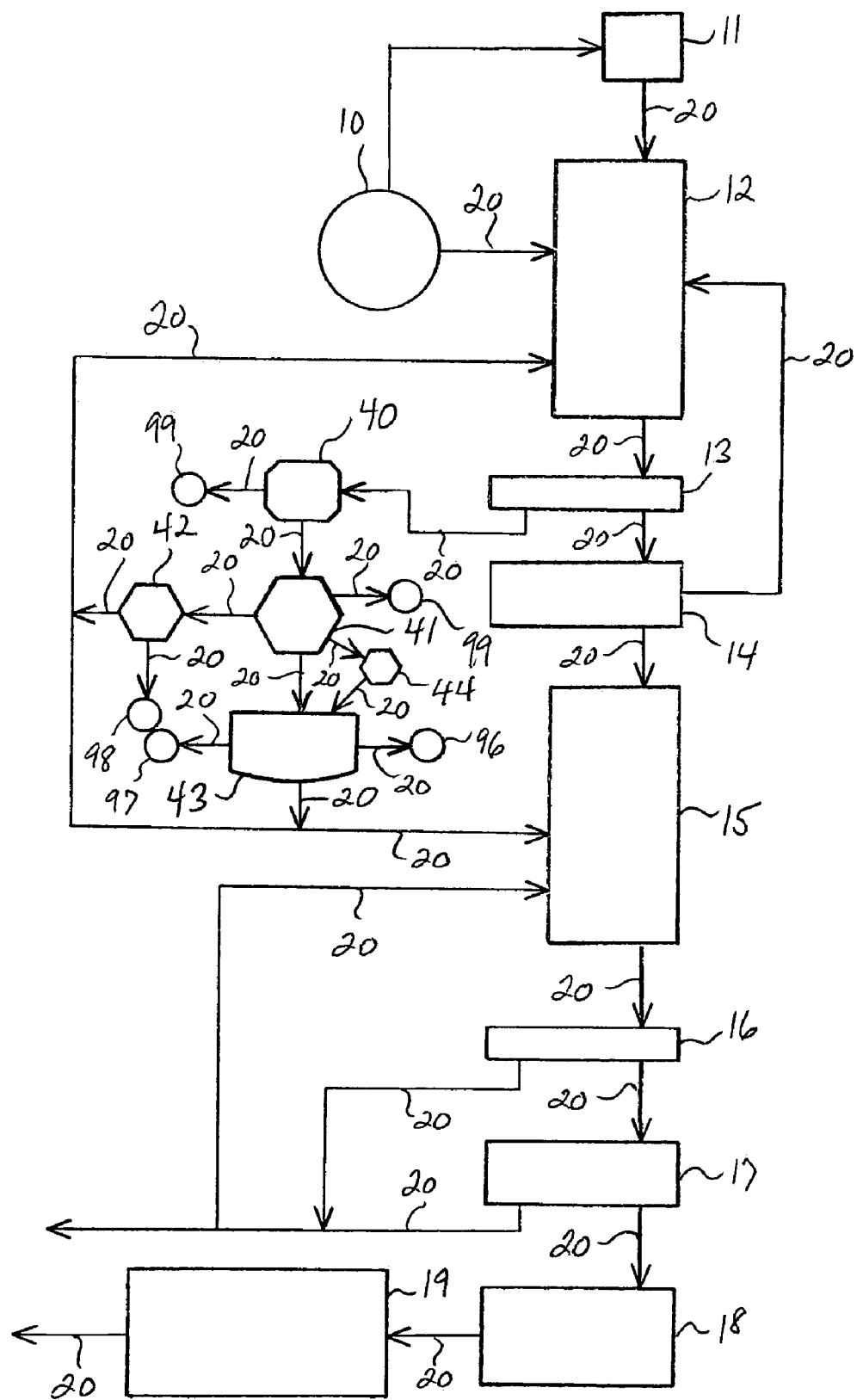
FIG. 2 is a schematic flow chart showing the system components of the invention.

With reference to the figures, the invention will now be described in detail with regard for the best mode and the preferred embodiments. In general, the invention is a method, and a system of components for accomplishing the method, for the processing of citrus peel, pulp waste and/or by-products, referred to hereafter collectively as citrus peel, which is produced during a juice extraction process, in order to recover useful liquid and solid components for future use, in a manner whereby the useful recovered components, such as d-limonene or peel oil, peel juice or syrup molasses, pectin pomace, citrus peel flour and many other liquid and dry masses, are of food-grade quality. Furthermore, the wastewater effluent produced by the system is sufficiently purified of suspended solids, soluble solids, sugars and oils, and in view of the fact that no chemical agents are added in the process, the waste water can be used as a consumable, salable liquid stream and can be safely discharged into standard sewer systems due to its low biological oxygen demand (BOD). The system and method comprise means to produce citrus peel oil, means to produce food grade citrus peel juice, aromas and essences, and means to produce food grade pectin pomace, all from waste citrus peel.

As shown in FIG. 2, the system components for practicing the method comprise various operational and treatment means connected by conveying or conduit means 20, wherein conduit means 20 comprise any known conveyors, pipes, hoses or the like capable of controlled movement of solids, slurries or liquids, the particular type of conduit means 20 being chosen dependent on the material being transported. The system components comprise a cutting means 11 to cut, shear or slice the citrus peel into small particles to create a slurry of solid particles and liquid via the addition of plant water or water from another adequate quality water source 10, conduit means 20 to deliver the slurry to first tank means 12 wherein the peel solid particles are mixed with liquid and heated, conduit means 20 to deliver the mixture to a first separator means 13 wherein the liquids and solids are separated, conduit means 20 to deliver the separated liquid to a rotary finisher means 40 wherein waste solids 99 are separated from finished liquid, conduit means 20 to deliver the finished liquid to a finishing separator means 41, preferably of the high speed centrifuge and decanting type, wherein primary citrus peel oil (d-limonene), a liquid products stream and waste sludge 99 are separated, conduit means 20 to deliver the citrus peel oil to a polisher centrifuge means 42 wherein high grade peel oil 98 is produced, and conduit means 20 to deliver the de-oiled and de-sludged liquid from the high speed centrifuge/decanter means 41 to an evaporator means 43, wherein the liquid is divided into three useful products—evaporated water proportionally distributed to first tank means 12 and second tank means 15 (and/or as a consumable, salable liquid stream), food grade citrus peel juice referred to as molasses 97, and high quality aromas and essences 96. Supplemental pasteurization/de-bittering means 44 to pasteurize and/or de-bitter the liquid may be employed prior to the evaporator means 43 when necessary for product criteria demands. The systems components further comprise conduit means 20 to deliver the wet peel solids from the first separator means 13 to a first press means 14, wherein liquid is separated from the solids and distributed to first tank means 12, conduit means 20 to deliver the solids to second tank means 15, wherein the pressed peel solids are mixed with liquid and heated, conduit means 20 to deliver the mixture to a second separator means 16, wherein the liquid is separated from the solids and distributed partially to second tank means 15, conduit means 20 to deliver the saturated pressed peel solids to a second press means 17, wherein liquid is separated from solids, conduit means 20 to deliver the solids to a first dryer means 18, and conduit means 20 to deliver the partially dried solids to a second dryer means 19 wherein pectin pomace or food grade peel mass end product are produced.

The methodology of the invention is practiced as follows. De-juiced citrus peel is taken from the citrus juice extractor equipment and delivered to cutting means 11 to cut the citrus peel into relatively small particle size. Most preferably, the citrus peel particles are produced using a cutting, shearing or slicing-type operation rather than by a hammering, thrashing or similar type impact operational method, as the latter will increase loss of peel mass and pectin due to the smearing and mashing effects of an impact-type disintegration process, which undesirably converts the peel into a paste that is lost into the liquid discharge during peel washing and other processing operations. Preferably, the cutting means 11 produces a particle size of approximately 0.1875 inches. Cutting means 11 may comprise, for example, an Urschel Comitrol 3600 brand blade-type disintegrator having a stationary head with a high-speed four-bladed steel dogleg cutter. The citrus peel particles will have greater than approximately 80 percent moisture (WWB) at this stage, and comprise approximately 7 percent soluble solids, approximately 9 percent suspended solids, and less than 1 percent of residual peel oil. Conveyance water from the plant water supply system 10 is added as necessary to create the proper slurry.

The particulate slurry of citrus peel and conveyance water is delivered by conduit means 20 of known type, preferably a positive displacement pump progressive cavity or Lobe-type design, or other comparable paper-stock-type transfer pump, such that extra shearing does not occur during conveyance, to a first tank means 12 to mix and heat the peel solids with liquid, the first tank means 12 comprising a relatively large tank having heating components, such as for example a submersion heating element or indirect hot water/steam jacketing, and content agitating and recirculating components, such as for example a low rpm paddle mixer and a common open impeller paper-stock-type pump and conduit system. Recirculated liquid recovered from subsequent processing steps involving the first press means 14, the polisher finisher means 42 and the evaporator means 43, and/or plant water if needed in the initial start-up phase or subsequent processing phases, is added as needed to the citrus peel slurry in first tank means 12, the slurry having an initial liquid-to-peel ratio of approximately 2.76–1. For example, approximately 40,000 pounds of cut peel is mixed with approximately 110,700 pounds of low brix liquid (approximately 1.3–2.6° brix), resulting in a liquid-to-peel ration of about 2.76–1. The mixture is heated to approximately 120–140° F. and held for approximately 10–20 minutes with continuous agitation and circulation, during which sugars and oils are released from the peel mass. This temperature range is suitable for inhibiting enzymatic activity so that fermentation is precluded. Excessive temperature, however, will lower hydrogen bond quantity, thereby adversely affecting gelling strength quality.

The mixture from first tank means 12 is transferred to the first separator means 13, possibly utilizing pumping means as required, to separate liquids from solids. First separator means 13 separates the mixture into approximately 54 percent liquid and 46 percent saturated solids, most preferably using agitation or vibration as by for example a vibratory, two-deck, combination conveyor/shaker bed having a stainless steel woven wire cloth screen suspended above a solid bottom. The hot liquid emulsion, which contains water, peel oil, suspended solids and soluble sugar solids, is now at approximately 3–5° brix and is delivered to a finisher means 40 comprising for example a liquid/solid separator apparatus utilizing a screw, paddle or equivalent mechanism to separate particulates greater than approximately 0.02 inches from the liquid. The waste particulate sludge 99 is discarded and the finished liquid is delivered from the finisher means 40 to a known-type peel oil (d-limonene)/water/sludge separator means 41, such as for example a high-speed centrifuge/decanter apparatus.

The finishing or centrifuge/decanter separator means 41 separates the finished liquid into three components—a peel oil (d-limonene) component, a liquid component and a waste sludge component 99. The sludge component 99 is conveyed and discarded. The peel oil (d-limonene) is delivered to a polisher centrifuge means 42 that produces a high grade peel oil 98. Liquid resulting from this process is re-circulated to first tank means 12. The liquid produced by the centrifuge/decanter separator means 41 is a de-sludged and de-oiled water emulsion and is delivered directly to an evaporator means 43, or when higher quality liquids are desired, is delivered first to pasteurization/de-bittering means 44 and then to evaporator means 43. The evaporator means 43 is preferably a Thermally Accelerated Short Term Evaporation (TASTE) system that separates the citrus peel juice (molasses) 97 and water, and that is also fitted with an essence/aroma condensation and collection recovery apparatus, such that three products are generated. The evaporator means 43 produces food grade quality molasses 97 (approximately 40–72° brix), food grade aromas and/or essences 96, and hot water (at approximately 120–150° F. and low BOD at approximately 0° brix). The hot water is proportionally conveyed to first tank means 12 and second tank means 15.

The hot saturated peel solids are delivered from the first separator means 13 to a first press means 14 where additional liquid is separated from the saturated solids. The saturated solids comprise approximately 89–91 percent moisture at a weight of approximately 69,320 pounds (based on an initial input of approximately 40,000 pounds of cut citrus peel). The press process yields approximately 22,700 pounds of pressed cake and approximately 46,300 pounds of liquid pressate. The liquid is re-circulated to the first tank means 12 and the solids are delivered to second tank means 15.

To the saturated solids delivered to second tank means 15 is added approximately 61,200 pounds of the water from evaporator means 43 and approximately 20,180 pounds of liquid (at approximately 2.5° brix) derived from a second press means 17. Second tank means 15 for mixing and heating the peel solids with liquid has heating and agitation components similar to first tank means 12, such that the mixture is held at a temperature of approximately 110–135° F. for approximately 10–20 minutes with continual agitation and circulation. The mixture is then delivered to a second separator means 16 to separate the liquids from the solids by vibration or agitation. Second separator means 16 may for example be identical to first separator means 13, comprising a vibratory two-deck combination conveyor/shaker bed having a stainless steel woven wire cloth screen suspended above a solid bottom. At this stage the separated liquid is approximately 55 percent of the total volume and the remaining solids represent approximately 45 percent. The liquid, combined with the liquid pressate from the second press means 17, is partially re-circulated to second tank means 15 for mixing with the cut and pressed peel cake, with the remainder being discarded to a sewer system. The saturated peel solids are conveyed from the second separator means 16 to press means 17.

Press means 17 preferably comprises a screw or belt press and achieves the final de-watering of the peel solids, separating out about 57 percent liquid and 43 percent solids having a moisture content of approximately 77–81 percent. The liquid pressate stream (at approximately 1.0–2.5° brix) is joined with the liquid pressate stream from second separator means 16 and partially delivered to second tank means 15 to mix with the cut and pressed peel cake. The solids produced by second press means 17 in the form of a peel cake are delivered to first dryer means 18 or are diverted to other extruded/texturized food processes as an integral high moisture ingredient.

First dryer means 18 is a "pre-dryer" in the sense that the peel cake is subjected to relatively high temperatures under short dwell time, such that approximately 50 percent of the water is removed in a manner that does not damage the pectin hydrogen bonding strength due to the evaporative cooling phenomenon to which the citrus peel cake is subjected. Preferably, first dryer means 18 is comprised of a fluidized bed design using high velocity (3,000–6,000 fpm) heated air (up to about 350° F.), such that a 3–9 minute product dwell time removes about 40–60 percent of moisture from the peel cake. The peel cake is then conveyed to a second dryer means 19.

Second dryer means 19 is a dryer having relatively long dwell time, low air velocity and low air temperatures, such as for example a multi-conveyor dryer such as a Wolverine-Proctor MCD brand dryer, a rotary drum dryer or similar type dryer apparatus. At the flow rate and mass described herein, drying for a dwell time of approximately 40–58 minutes at a maximum temperature of about 150° F. reduces the moisture content of the peel cake from an in-coming moisture content of 40–60 percent to the desired final product moisture content of approximately 10–15 percent. Combining these drying methods results in an efficient, low particulate and low VOC (volatile organic compounds) emission drying method that produces high quality pectin pomace and food grade quality citrus peel mass. For the production of consumable dried peel masses not sensitive to hydrogen bonding qualities, such as citrus peel fiber, flour type products or absorbent material products for use in pet bedding, oil absorbance, etc. The pectin pomace, citrus peel flour stock, etc., is then removed from second dryer means 19 for further milling, packaging, storage, transport and/or the like.

It is understood that equivalents and substitutions for certain elements set forth above may be obvious to those skilled in the art, and therefore the true scope and definition of the invention is to be as set forth in the following claims.

I claim:

1. A method of processing citrus peel comprising:
    cutting said citrus peel into particles to create a slurry of solid particles and liquid;
    adding water to, heating and mixing said slurry of solid particles and liquid;
    separating said solid particles and said liquid;
    separating said liquid into waste solids and finished liquid;
    separating said finished liquid into citrus peel oil, liquid products and waste sludge;
    converting said citrus peel oil into high grade peel oil;
    evaporating said liquid products to produce water for recycling within said system, food grade citrus peel juice and aromas and essences;
    pressing said solid particles to produce liquid for recycling within said system;
    adding water to, heating and mixing said solid particles;
    separating liquid from said solid particles;
    pressing said solid particles to produce water for recycling within said system and water to be discarded from said system;
    drying said solid particles to produce food grade pectin pomace.

2. The method of claim 1, wherein said step of separating said finished liquid into citrus peel oil, liquid products and waste sludge comprises centrifuging and decanting said liquid products.

3. The method of claim 1, wherein said step of cutting said citrus peel into particles to create a slurry of solid particles and liquid comprises cutting said citrus peel into particles of approximately 0.1875 inches in size.

4. The method of claim 1, wherein said step of adding water to, heating and mixing said slurry of solid particles and liquid comprises heating said slurry to between approximately 120 to 140 degrees F.

5. The method of claim 1, wherein said step of adding water to, heating and mixing said solid particles comprises heating said solid particles to between approximately 110 to 135 degrees F.

6. The method of claim 1, wherein said step of drying said solid particles to produce food grade pectin pomace comprises a first drying step of heating said solid particles at up to 350 degrees F. and a second drying step of heating said solid particles at less than 150 degrees F.

7. The method of claim 6, wherein said first drying step is performed faster than said second drying step.

8. The method of claim 7, wherein said first drying step is performed for approximately 3 to 9 minutes on a fluidized bed dryer and said second drying step is performed for approximately 40 to 58 minutes on a multi-conveyor dryer.

9. The method of claim 1, further comprising the step of pasteurizing and de-bittering said liquid products prior to said step of evaporating said liquid products.

10. The method of claim 1, wherein said step of separating said solid particles and said liquid and said step of separating liquid from said solid particles is performed on a vibratory conveyor/shaker bed apparatus.

11. The method of claim 1, wherein said step of evaporating said liquid products is performed on a thermally accelerated short term evaporation apparatus.

12. The method of claim 1, wherein step of separating said solid particles and said liquid comprises recycling said liquid within said system, and wherein said step of separating liquid from said solid particles comprises recycling a portion of said liquid within said system and discarding a portion of said liquid from said system.

13. A method of processing citrus peel comprising:
- cutting said citrus peel into particles to create a slurry of solid particles and liquid;
- adding water to, heating and mixing said slurry of solid particles and liquid;
- separating said solid particles and said liquid;
- separating said liquid into waste solids and finished liquid;
- separating said finished liquid into citrus peel oil, liquid products and waste sludge by centrifuging and decanting said liquid products;
- converting said citrus peel oil into high grade peel oil;
- pasteurizing and de-bittering said liquid products;
- evaporating said liquid products to produce water for recycling within said system, food grade citrus peel juice and aromas and essences;
- pressing said solid particles to produce liquid for recycling within said system;
- adding water to, heating and mixing said solid particles;
- separating liquid from said solid particles and recycling a portion of said liquid within said system and discarding a portion of said liquid from said system;
- pressing said solid particles to produce water for recycling within said system and water to be discarded from said system;
- drying said solid particles to produce food grade pectin pomace, wherein said drying is preformed first as a high temperature, short dwell time operation and second as a low temperature, long dwell time operation.

* * * * *